United States Patent [19]

Yotsutani et al.

[11] Patent Number: 4,640,986

[45] Date of Patent: Feb. 3, 1987

[54] MOBILE RADIO COMMUNICATION SYSTEM

[75] Inventors: Akio Yotsutani; Masayuki Makino; Noboru Saegusa; Tomoshi Sone, all of Tokyo, Japan

[73] Assignee: NEC Corporation, Japan

[21] Appl. No.: 650,767

[22] Filed: Sep. 13, 1984

[30] Foreign Application Priority Data

Sep. 16, 1983 [JP] Japan .................. 58-170758
Sep. 16, 1983 [JP] Japan .................. 58-170761

[51] Int. Cl.⁴ .............................................. H01Q 7/04
[52] U.S. Cl. ...................... 379/60; 235/381; 379/63; 379/126
[58] Field of Search ............. 179/2 E, 2 EA, 2 EB, 179/18 DA, 6.3 MA, 6.3 CC; 340/828.35; 235/378, 381, 379

[56] References Cited

U.S. PATENT DOCUMENTS 3,609,246 9/1971 Garches et al. ............... 179/41 A
4,146,746 3/1979 De Crepy et al. ............ 179/7.1 TP
4,247,759 1/1981 Yuris et al. ...................... 235/381

FOREIGN PATENT DOCUMENTS 3108675 12/1982 Fed. Rep. of Germany ....... 179/6.3 CC
107375 8/1980 Japan ............................... 179/6.3 CC Primary Examiner—Robert G. Lev
Attorney, Agent, or Firm—Laff, Whitesel, Conte & Saret

[57] ABSTRACT

A mobile radio communication system having a plurality of fixed stations respectively connected to a plurality of subscriber's lines extending from a telephone exchange, and a plurality of mobile stations linked with the fixed stations through radio channels. Each of the mobile stations effect speech via one of the fixed stations. The system comprises means provided for each fixed station for transmitting rate charging information from the telephone exchange to a mobile station under speech, and rate collecting means provided for each mobile station and being responsive to the rate charging information to vary its content.

12 Claims, 7 Drawing Figures

MOBILE RADIO COMMUNICATION SYSTEM

BACKGROUND OF THE INVENTION

This invention relates to a mobile radio communication system comprising a fixed station connected to a subscriber's line of a telephone exchange and a mobile station linked with the fixed station through a radio channel, and more particularly to a mobile radio communication system having an improved charging system.

As one of radio telephone systems, there is a cordless telephone system in which a cordless telephone set is linked with only one fixed station through a radio channel. Therefore, its service area is extremely small. For this reason, the cordless telephone set can not be used on the outside of the area, so that a user must use a nearby public telephone set.

Although a radio paging (pocket bell system) has a wide service area, this system is used for only calling, so that the user must also use a public telephone set at the time of origination.

A wide area radio telephone system can solve these problems and it is desirable to provide a wider area radio telephone system which can ensure origination and termination at any place and at any time. Such a system, however, necessarily uses a telephone line and faces an important problem in charging rate at the time of origination from a mobile station or a mobile set.

SUMMARY OF THE INVENTION

It is an object of this invention to provide a mobile radio communication system capable of ensuring a telephone service in a wide area with a relatively small number of radio channels by providing rate charging means for a mobile station which can be connected to any fixed station installed at a terminal end of a telephone network.

Another object of this invention is to provide a novel mobile radio communication system capable of increasing the service area of a mobile station by permitting a mobile station to be connected to any fixed station of a public telephone network and to a specific fixed station of an ordinary or non-public telephone network.

According to the present invention, in a mobile radio communication system comprising a plurality of fixed stations respectively connected to a plurality of subscriber's lines extending from a telephone exchange, and a plurality of mobile stations linked with the fixed stations through radio channels, each of the mobile stations effecting speech via one of the fixed stations, the system comprises means provided for each fixed station for transmitting rate charging information from the telephone exchange to a mobile station under speech, and rate collecting means provided for each mobile station and being responsive to the rate charging information to vary its content.

BRIEF DESCRIPTION OF THE DRAWINGS

In the accompanying drawings.

DESCRIPTION OF THE PREFERRED EMBODIMENTS

The invention will now be described in detail with reference to the accompanying drawings.

Figure 1:
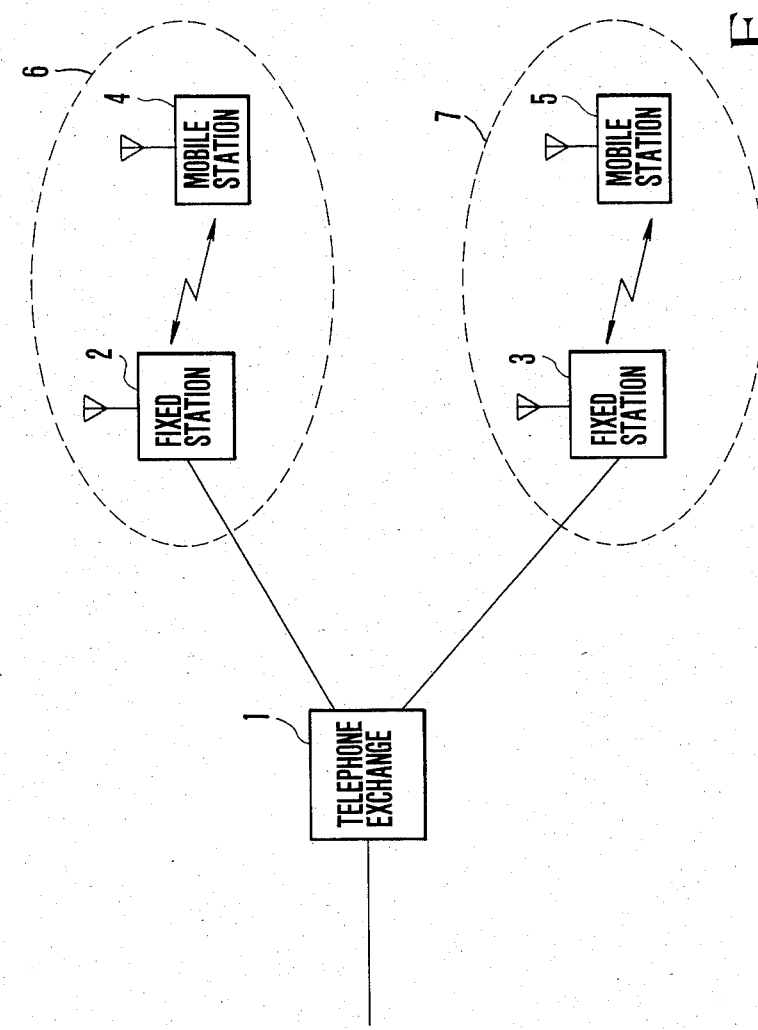
FIG. 1 is a block diagram showing a system to which the mobile radio communication system of this invention is applicable.

The mobile radio communication system shown in FIG. 1 comprises a telephone exchange 1, fixed stations 2 and 3, and mobile stations 4 and 5. Reference numerals 6 and 7 designate the service areas of fixed stations 2 and 3, respectively.

When the mobile station 4 originates, an origination connection is made to the fixed station 2, since the mobile station 4 is in the service area of the fixed station 2. After the speech starts, the telephone exchange 1 transmits a rate charging signal which corresponds to the speech time is sent to the fixed station 2. The fixed station 2 transmits the rate charging signal to the mobile station 4. The mobile station 4 has a rate charging circuit including a telephone card or the like which has been purchased by the user of the mobile telephone and is capable to memorize remaining time or amount of money which can be usable for speech and is capable to update the memory content thereof. The rate to be collected which corresponds to the rate charging signal is subtracted from the memory content of the telephone card or the like. When the mobile station 4 moves to a position of a mobile station 5 and then originates, an origination connection is made to the fixed station 3 since the mobile station 5 is in the service area of the fixed station 3. Then, the fixed station 3 transmits to the mobile station 5 a rate charging signal in order for the mobile station 5 to collect the rate, thus permitting talking.

Figure 2:
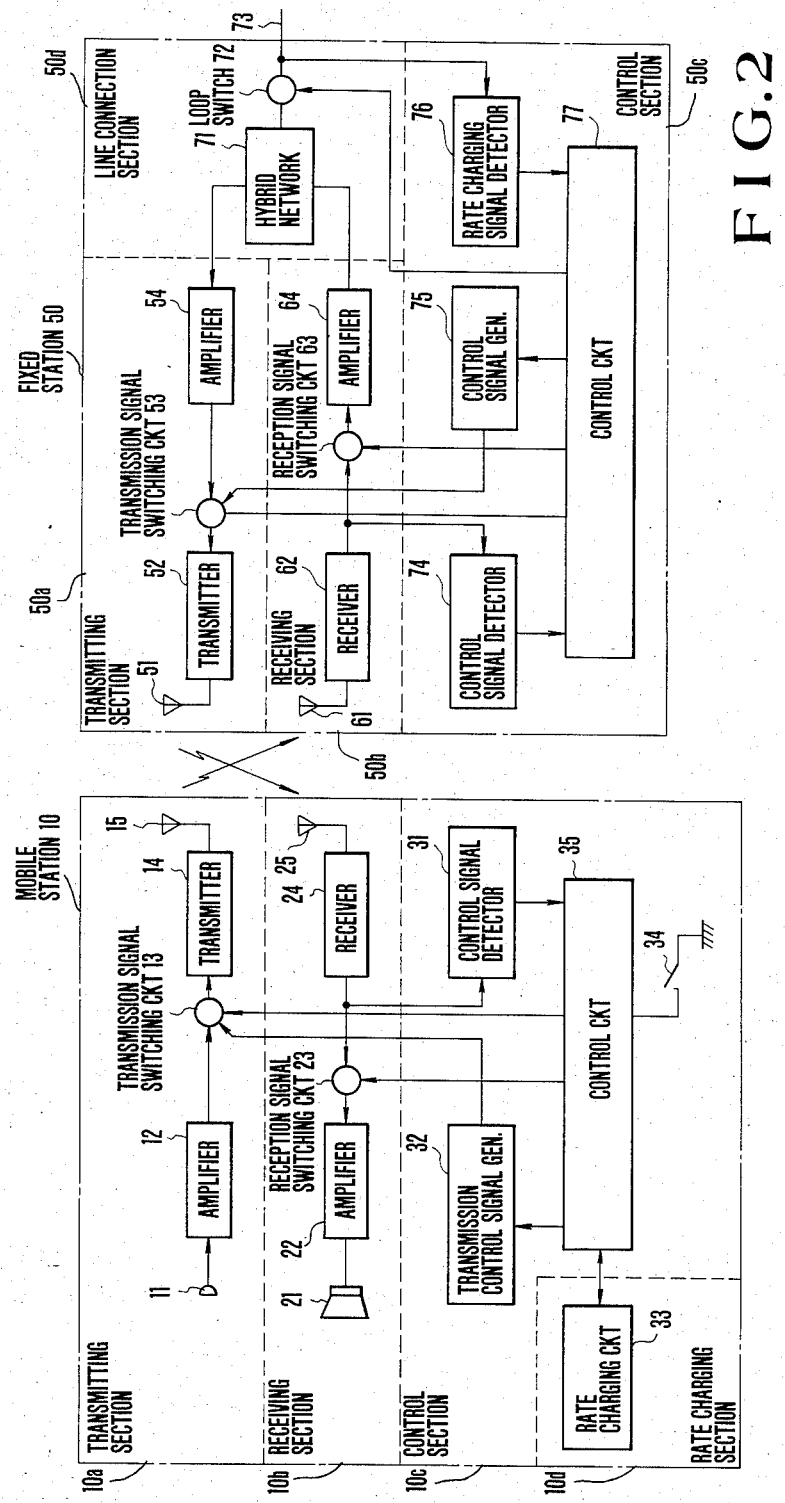
FIG. 2 is a block diagram showing an embodiment of a mobile station and a fixed station (or fixed radio station) employed in the system of this invention.

The mobile station and the fixed station as operable in the system of FIG. 1 are exemplified as a mobile station 10 and a fixed station 50 in FIG. 2 in accordance with teachings of the present invention. The mobile station 10 comprises a transmitting section 10a, a receiving section 10b, a control section 10c, and a rate charging section 10d. The transmitting section 10a includes a telephone transmitter (microphone) 11, an amplifier 12 amplifying a voice signal from the transmitter 11, a transmission signal switching circuit 13 connected to the output of the amplifier 12 for switching a transmission signal to a transmitter 14 which converts the transmission signal from the switching circuit 13 into a radio frequency signal, and a transmitting antenna 15 for radiating the output of the transmitter 14 into air.

The receiving section 10b includes a receiver 24 for receiving and demodulating a radio frequency signal from a receiving antenna 25, a reception signal switching circuit 23 connected to receive the demodulated output of the receiver 24 for passing only a voice signal, and an amplifier 22 for amplifying the voice signal outputted from the switching circuit 23 and driving a telephone receiver 21.

The control section 10c includes a control signal detector 31, a transmission control signal generator 32, a hook switch 34, and a control circuit 35. The detector 31 receives the demodulated output of the receiver 24 and detects a control signal contained in the demodulated signal and sent from the fixed station. The control circuit 35 decodes the output signals from the detector 31 and the hook switch 34 to control the switching circuits 13 and 23, as well as the generator 32 and a rate charging circuit 33. The generator 32 is responsive to a signal from the control circuit 35 and generates a transmission control signal which is sent to the switching circuit 13.

The rate charging section 10c includes the rate charging circuit 33 connected to the control circuit 35 and containing an amount of money information representing the rate.

The switching circuit 13 responds to a switch control signal from the control circuit 35 and supplies either the voice signal (information signal) from the amplifier 12 or the transmission control signal from the generator 32, to the transmitter 14. The switching circuit 23 prevents the passage of the other signal than the voice signal to the amplifier 22 in response to a rate charging signal or other control signals from the control circuit 35.

The fixed station 50 comprises a transmitting section 50a, a receiving section 50b, a control section 50c and a line connection section 50d.

The line connection section 50d includes loop switch 72 connected to a telephone subscriber's line 73 from the telephone exchange, and a hybrid network 71 having two wire/four wire conversion performance.

The transmitting section 50a includes an amplifier 54 connected to the network 71 for amplifying the voice signal from the subscriber's line 73 and outputted from the network 71, a transmission signal switching circuit 53 for switching the output of a control signal generator 75, a transmitter 52 for connecting the output of the switching circuit 53 into a radio frequency signal, and a transmission antenna 51 for radiating into air the output of the transmitter 52.

The receiving section 50b includes a receiver 62 for receiving and demodulating the radio frequency signal from a receiving antenna 61, a reception signal switching circuit 63 connected to receive the demodulated output of the receiver 62 for passing only the voice signal, and an amplifier 64 amplifying the output signal of the reception signal switching circuit 63 for supplying an amplified signal to the network 71.

The control section 50c includes a control signal detector 64 connected to receive the demodulated output of the receiver 62 for detecting a control signal from the mobile station, a rate charging signal detector 76 connected to the subscriber's line 73 for detecting a rate charging signal sent from the telephone exchange, a control circuit 77 which is responsive to signals sent from the rate charging signal detector 76 and the control signal detector 74 for controlling the switching circuits 53 and 63, the loop switch 72 and the generator 75. The generator 75 is responsive to a signal from the control circuit 77 and generates a transmission control signal sent to the transmission signal switching circuit 53.

The switching circuits 53 and 63 operate in a similar manner to the circuits 13 and 23, respectively.

The speech operation of the mobile station 10 and the fixed station 50 having construcions as described above will now be described.

To originate at the mobile station 10, the hook switch 34 is first operated. In response to a signal from the hook switch 34, the control circuit 35 is started to control the generator 32 and the switching circuit 13 so as to cause the transmitter 14 to send an origination signal to the fixed station 50. The origination signal is received by the receiver 62 of the fixed station 50, and this signal is detected by detector 74 and then inputted to the control circuit 77. In response to the origination signal from the mobile station 10, the control circuit 77 operates the loop switch 72 so as to send the origination signal to the telephone exchange to start speech.

Figure 3:
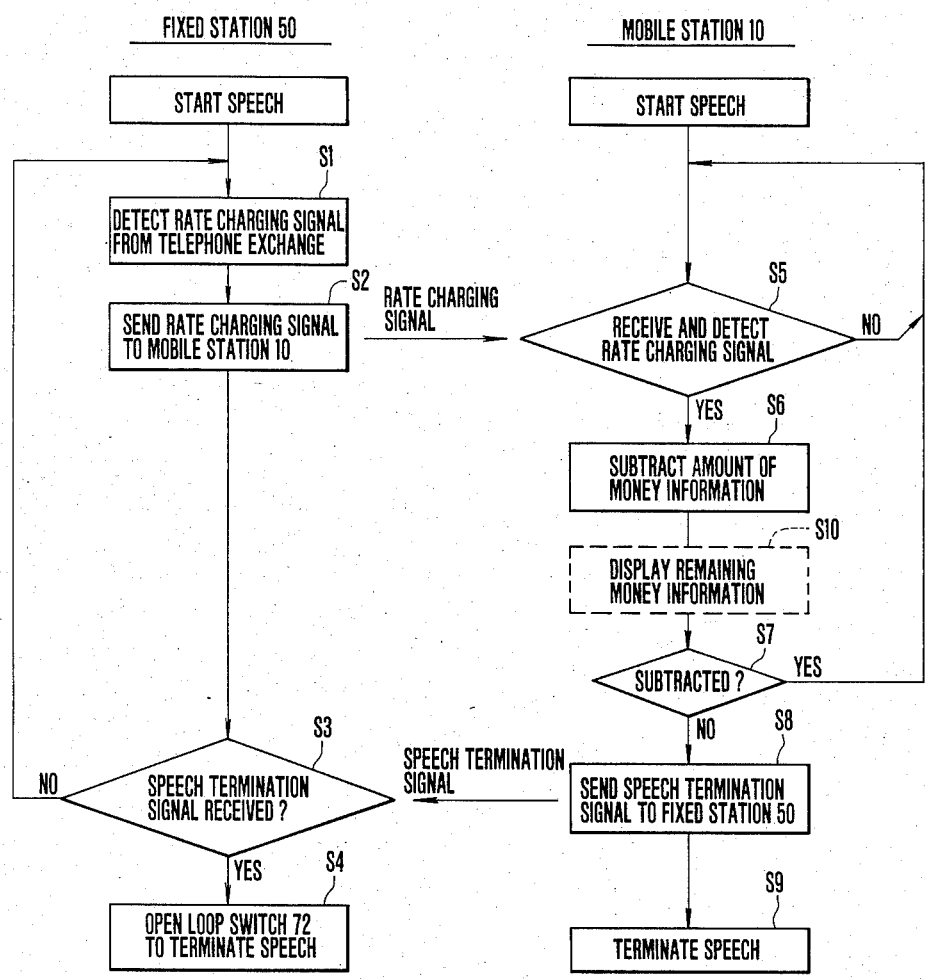
FIG. 3 is a flow chart for explaining the operation of the apparatus shown in FIG. 2.

The rate charging operation characterizing the invention will be described with reference to the flow chart shown in FIG. 3.

When speech is started, a rate charging signal corresponding to a speech rate is sent from the telephone exchange through the subscriber's line 73. Generally, the rate charging signal is formed by inverting the polarity of a signal on the subscriber's line 73. The rate charging signal is detected by the rate charging signal detector 76 at step S1 and applied to the control circuit 77. In response to the signal from the rate charging signal detector 76, the control circuit 77 drives the control signal generator 75 and switches the switching circuit 53 so that the output signal of the generator 75 is supplied to the transmitter 52, thereby causing the transmitter 52 to send a rate charging signal to the mobile station 10 at step S2. At step S5, the mobile station 10 receives the rate charging signal from the fixed station 50 and the rate charging signal is detected by the control signal detector 31 and supplied to the control circuit 35. At step S6, the control circuit 35 inputted with the rate charging signal subtracts an amount corresponding to the rate charging signal from the amount of money information of the rate charging circuit 33, thereby collecting the rate. Where the money information has been reduced to a value at which substraction is no more possible, the speech must be interruptted since it is impossible to collect the rate any more. When this state is detected by the control signal, the generator 32 is driven, at step S8, to generate a speech termination signal which is transmitted to the fixed station 50 via transmitter 14, thus terminating the speech at step S9. At step S3, the speech termination signal from the mobile station is receive by the receiver 62 of the fixed station 50, detected by the control signal detector 74 and then supplied to the control circuit 77. The control circuit 77 inputted with the speech termination signal controls the loop switch 72 to open a DC loop, thus terminating the speech through the telephone exchange at step S4.

The rate charging circuit 33 storing an amount of money information and acting as rate collecting means utilizes a magnetic memory such as a magnetic card or a bubble memory device, and an information read/write circuit. The rate charging circuit 33 is then constructed such that when collecting a rate corresponding to the rate charging signal, the amount of money information stored in the memory device of the rate charging circuit 33 is read out through the read/write circuit. An amount of money information from which the rate to be collected has been subtracted is written again into the memory device through the read/write circuit. When the remaining amount of money becomes zero, the user should purchase a new telephone card. For constructing the magnetic rate collecting device, the magnetic memory may be replaced by such a semiconductor memory as a random access memory (RAM) or a fuse read only memory.

Figure 4:
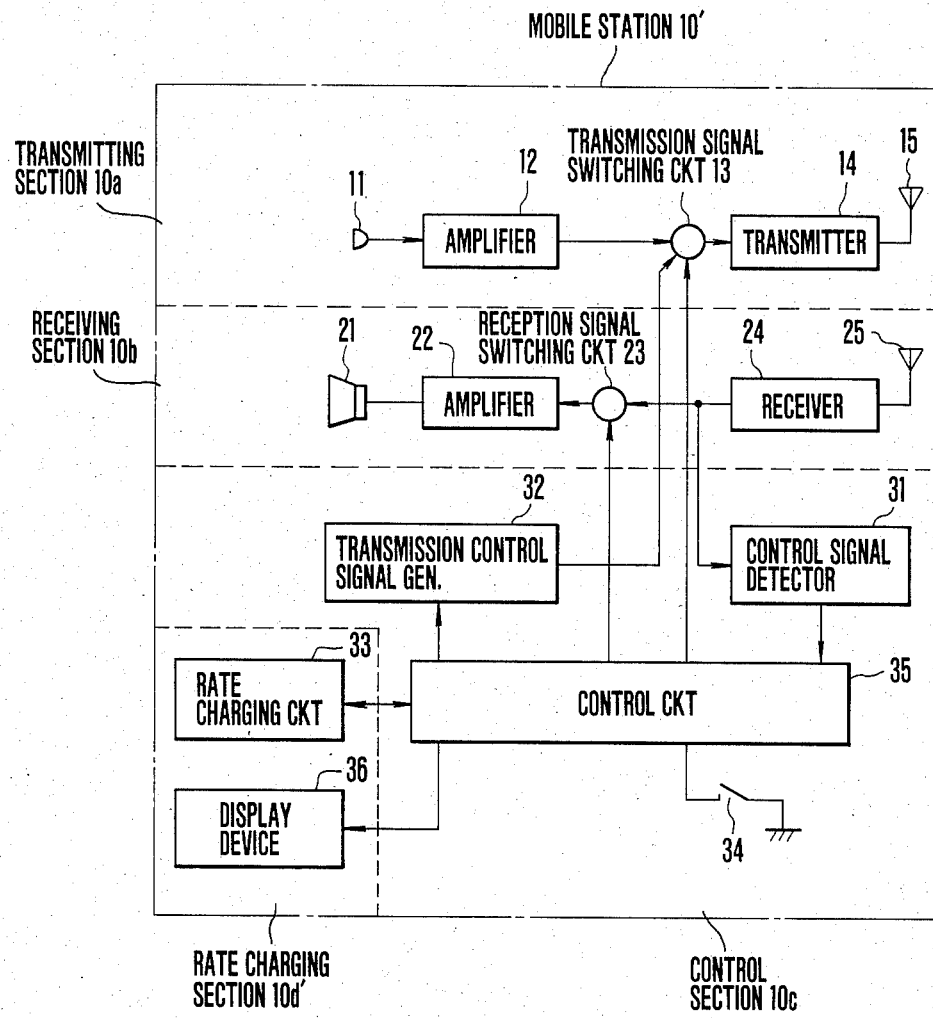
FIG. 4 is a block diagram showing a modification of the mobile station shown in FIG. 2.

FIG. 4 shows a modification of the mobile station utilized in the system of this invention. The mobile station shown in FIG. 4 is characterized in that a display device 36 displaying an amount of money information is added to the rate charging circuit 33 shown in FIG. 2. As shown by step S10 in FIG. 3, the display device 36 is controlled by the control circuit 35 to display the state of rate collection. Accordingly, the user of the mobile station is informed of the amount of the remaining money which can be used for speech. This performance is used to check the amount of money information of the rate charging circuit 33 at the time of origination and prior to the sending out of the speech signal. When there is no money remaining, that is, where the collection of rate is impossible, this state is displayed to stop the origination, thus preventing emitting of useless electric wave.

In the embodiment described above, when the fixed station 50 is connected to a telephone exchange of a public telephone network, it is possible to collect the rate by transmitting the rate information from a public telephone exchange network to the fixed station 50 without modifying the telephone exchange, thus simplifying the construction of the system. In this case, the fixed station 50 may be installed near a public telephone set, for example, in the same public telephone box in which a public telephone set commonly utilizing the telephone line is installed. Further, it is possible to mount the fixed station on a near by telephone post.

As described above, according to this invention, since the rate collecting means is provided for a mobile station, it is possible to collect the rate without modifying the rate collecting system of the telephone exchange system. For this reason, notwithstanding with a small zone system, no position registration and no individual identification of the mobile stations from the side of the telephone exchange are necessary. Thus, a mobile station can be connected to any fixed station and it is possible to realize a wide area telephone service with a small cost.

Figure 5:
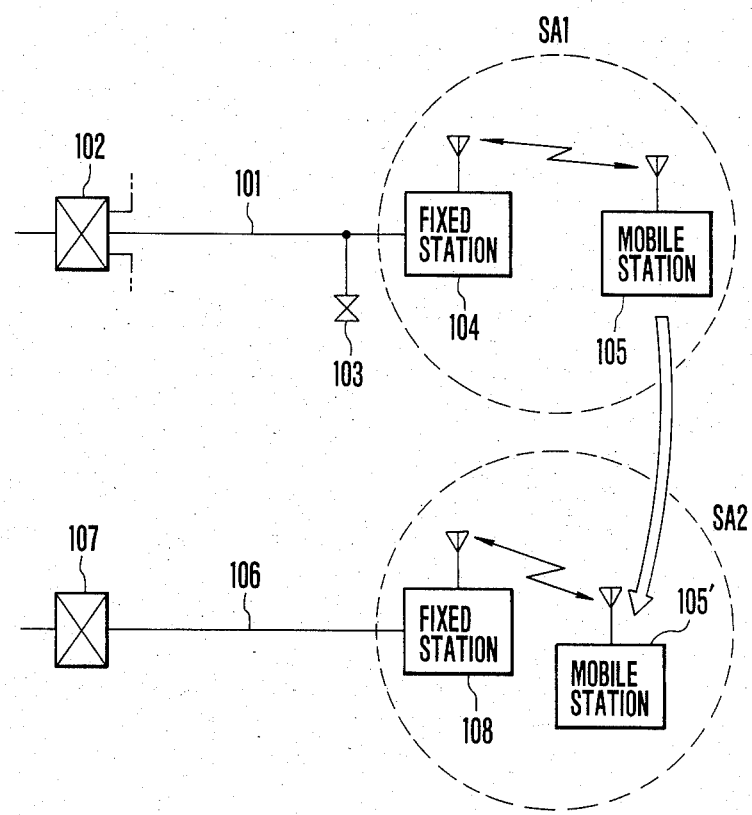
FIG. 5 is a diagramatic representation showing another system to which the mobile radio communication system of this invention is applicable.

FIG. 5 shows another system to which the mobile communication system of this invention is applied. The system shown therein comprises an ordinary subscriber's line 101, a telephone exchange 102 connected to the line 101, a telephone set 103, a fixed station 104, and a mobile station 105 connected to the fixed station through a radio channel. The service area of the mobile station 105 is shown by SA1 which is the same as that of the ordinary cordless telephone system.

According to this invention, the mobile station 105 can be rendered operative on the outside of the ordinary service area SA1. It is now assumed that the mobile station 105 has moved into service area SA2 as shown by 105'. The service area SA2 is serviced by a fixed station 108 connected to a public telephone line, and the fixed station 108 and the mobile station 105' are interconnected by a radio channel.

In accordance with the invention, the mobile station is made compatible to both the service areas SA1 and SA2 associated with the ordinary subscriber's line and the public telephone line, respectively. Since the collection of rate on the mobile station is required when the mobile station is connected to any fixed station connected to the public telephone line whereas the collection of rate is not required when the mobile station is connected to a specific fixed station connected to the ordinary subscriber's line, accessing to the rate collecting means on the mobile station is enabled or disabled in accordance with a service area in which the mobile station exists.

Figure 6A:
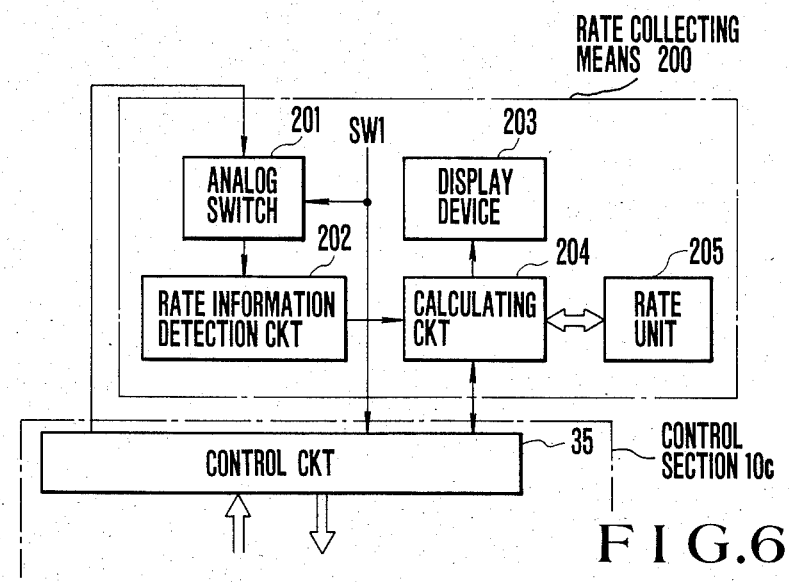
FIG. 6A shows one example of a rate charging unit.

An example of rate collecting means to this end is illustrated in FIG. 6A. A rate collecting means 200 may substitute for the rate charging circuit 33 and display device 36 shown in FIG. 4. An analog switch 201 and a rate information detection circuit 202 are interposed between the control circuit 35 and a rate charging device including a calculating circuit 204, a rate unit 205 comprising a magnetic card, semiconductor memory or the like, and a display device 203.

The operation of the mobile station in the service area SA1 is similar to that of the prior art cordless telephone system, and the rate collection is made on the side of the telephone exchange. For this reason, the rate collecting means 200 is rendered inoperative by so operating a switch SW1 that the analog switch 201 is opened. The state of the switch SW1 is detected by the control circuit 35 so as to send out a control signal in an ordinary mode.

When the mobile station is used in the service area SA2, the switch SW1 is maintained in a rate mode with the analog switch 201 turned on or closed. Consequently, rate information sent from the telephone exchange connected to the public telephone line at the time of speech is detected by the rate information detection circuit 202 and sent to the calculating circuit 204. Each time the rate information is inputted, the calculating circuit 204 changes the content of the rate unit 205, and the rate state of the rate unit 205 is displayed on the display device 203.

Figure 6B:
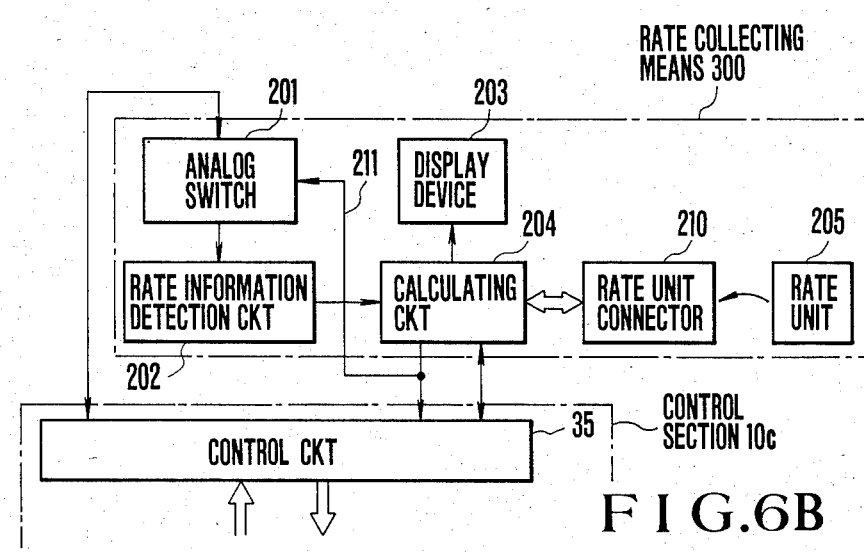
FIG. 6B shows another example of the rate charging unit.

Instead of utilizing the switch SW1 which switches service areas SA1 and SA2 for a mobile station, the rate unit may be made physically removable. There are two methods of removal. First, the rate collecting means 200 shown in FIG. 6A is constructed as a cartridge type so that the mode can be switched by mounting and dismounting the cartridge type rate collecting means. This method can be used widely because the cartridge type rate collecting means can be optionally mounted on the prior art cordless telephone set. Second, as shown in FIG. 6B, the rate unit 205 in the form of a magnetic card or a semiconductor memory is made removable. When the rate unit 205 is connected to a rate unit connector 210, the calculating circuit 204 sets the mobile station in a rate mode through a signal line 211 to enable the connection to the fixed station connected to the public telephone line. This method is advantageous in that when the rate unit is in the form of a magnetic card, switching operation becomes easy. In FIG. 6B, a rate collecting means is generally designated by 300.

As described above, this modification permits the connection of a mobile station to a specific subscriber's line or any public telephone line, thereby increasing the service area of the mobile station.

What is claimed is:

1. In a mobile radio communication system comprising a plurality of fixed stations respectively connected to a plurality of subscriber's lines extending from a telephone exchange, and a plurality of mobile stations linked with said fixed stations through radio channels, each of said mobile stations effecting speech via one of said fixed stations, the improvement which comprises means provided for each fixed station for transmitting rate charging information from said telephone exchange to a mobile station under speech, and rate collecting means provided for each mobile station and being responsive to said rate charging information to vary its content.

2. The mobile radio communication system according to claim 1 wherein said rate collecting means comprises a rate charging circuit for storing an amount of money information, said stored information being varied in response to said rate information.

3. The mobile radio communication system according to claim 1 wherein said rate collecting means comprises display means for displaying contents of a rate charging circuit of said rate collecting means.

4. The mobile radio communication system according to claim 1 wherein said rate collecting means comprises switching means for enabling the connection of said rate charging information to a rate charging circuit of said rate collecting means when said mobile station under speech connects to a fixed station connected to a subscriber's line of public telephone and for disabling said connection when said mobile station under speech connects to a specific fixed station connected to an ordinary subscriber's line.

5. The mobile radio communication system according to claim 4 wherein said switching means comprises a switch for electrically disconnecting said rate collecting means from said mobile station.

6. The mobile radio communication system according to claim 4 wherein said switching means comprises means for physically disconnecting said rate collecting means from said mobile station.

7. The mobile radio communication system according to claim 1 wherein said rate collecting means comprises a magnetic card or a semiconductor memory.

8. The mobile radio communication system according to claim 4 wherein said rate collecting mean comprises a magnetic card or a semiconductor memory.

9. The mobile radio communication system according to claim 8 wherein said switching means comprises a switch for electrically disconnecting said rate collecting means form said mobile station in response to mounting and dismounting of said magnetic card or semiconductor memory.

10. A mobile station linking with a fixed station through radio channel comprising:
   a transmitting section for transmitting a transmission information signal and a transmission control signal to said fixed station connected to a subscriber's line;
   a receiving section for receiving a reception information signal and a reception control signal from said fixed station;
   a rate charging section; and
   a control section for controlling access of said reception control signal to said rate charging section and transmission of said transmission control signal from said rate charging section to said fixed station.

11. The mobile station according to claim 10 wherein said transmitting section comprises a switching means which switches passages of said transmission information signal and said transmission control signal in accordance with a switch control signal from said control section.

12. The mobile station according to claim 10 wherein said receiving section comprises a switching means which stops passage of said reception information signal in accordance with said reception control signal.

* * * * *